US 8,825,946 B2

(12) United States Patent
Kato et al.

(10) Patent No.: US 8,825,946 B2
(45) Date of Patent: Sep. 2, 2014

(54) MEMORY SYSTEM AND DATA WRITING METHOD

(75) Inventors: Ryoichi Kato, Kanagawa (JP); Mitsunori Tadokoro, Kanagawa (JP); Takashi Hirao, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 106 days.

(21) Appl. No.: 13/616,466

(22) Filed: Sep. 14, 2012

(65) Prior Publication Data

US 2013/0246716 A1    Sep. 19, 2013

(30) Foreign Application Priority Data

Feb. 23, 2012    (JP) ................................. 2012-038017

(51) Int. Cl.
*G06F 12/00* (2006.01)
(52) U.S. Cl.
USPC ........... 711/103; 711/118; 711/126; 711/165; 711/171
(58) Field of Classification Search
CPC .............................. G06F 3/0685; G06F 3/0688
USPC .................................. 711/103, 126, 165, 171
See application file for complete search history.

(56) References Cited

U.S. PATENT DOCUMENTS

| | | | |
|---|---|---|---|
| 7,039,781 B2 | 5/2006 | Iwata et al. | |
| 2006/0250721 A1* | 11/2006 | Suzuki et al. | 360/46 |
| 2008/0301198 A1* | 12/2008 | Watanabe et al. | 707/201 |
| 2010/0169597 A1 | 7/2010 | Yonezawa et al. | |
| 2013/0103910 A1* | 4/2013 | Bentley et al. | 711/141 |

FOREIGN PATENT DOCUMENTS

| | | |
|---|---|---|
| JP | 2010-152514 | 7/2010 |
| JP | 4715155 | 4/2011 |
| JP | 2011-175666 | 9/2011 |
| JP | 4812192 | 9/2011 |
| JP | 2012-33002 | 2/2012 |

OTHER PUBLICATIONS

U.S. Appl. No. 13/609,991, filed Sep. 11, 2012, Hirao, et al.
U.S. Appl. No. 13/599,087, filed Aug. 30, 2012, Yonezawa, et al.

* cited by examiner

*Primary Examiner* — John Lane
(74) *Attorney, Agent, or Firm* — Oblon, Spivak, McClelland, Maier & Neustadt, L.L.P.

(57) ABSTRACT

According to one embodiment, when a controller writes update data in a second memory to a first memory which is nonvolatile and a difference between a size of a page and a size of the update data is equal to or greater than a size of a cluster, the controller configured to generate write data by adding, to the update data, data which has the size of the cluster, store an update content of management information corresponding to the update data and an update content storage position indicating a storage position of the update content of the management information in the first memory, and write the generated write data to a block in writing of the first memory.

20 Claims, 10 Drawing Sheets

MEMORY SYSTEM AND DATA WRITING METHOD

CROSS-REFERENCE TO RELATED APPLICATIONS

This application is based upon and claims the benefit of priority from Japanese Patent Application No. 2012-38017, filed on Feb. 23, 2012; the entire contents of which are incorporated herein by reference.

FIELD

Embodiments described herein relate generally to a memory system and a data writing method.

BACKGROUND

In the past, in a memory system in which a NAND flash memory (hereinafter, referred to as a NAND memory) is used as a nonvolatile memory unit, user data is written to the NAND memory in a page unit in response to an instruction from, for example, a host apparatus. Further, a management table for managing the storage position of data in the NAND memory is stored in the NAND memory and update information of the management table changes corresponding to the writing of the user data is also written to the NAND memory.

In the conventional technology, however, the user data and the update information of the management table are separately written, and thus the latency of the NAND memory consequently worsens.

DETAILED DESCRIPTION

In general, according to one embodiment, there is provided a memory system including a first memory that is nonvolatile, a second memory, and a controller. The first memory includes a plurality of blocks. Each of the plurality of blocks is a data erasing unit and includes a plurality of pages. Each of the plurality of pages is a data writing unit and capable of storing a plurality of clusters. Further, the first memory includes a management information storage region in which management information indicating a storage position of the data in the first memory is stored. The second memory configured to temporarily store data read out from the first memory. The controller configured to write data stored in the second memory to the first memory in the page unit and manage the storage position of the data in the first memory. When the controller writes update data in the second memory to the first memory and a difference between a size of the page and a size of the update data is equal to or greater than a size of the cluster, the controller configured to generate write data by adding, to the update data, data shich has the size of the cluster, store an update content of the management information corresponding to the update data and an update content storage position indicating a storage position of the update content of the management information in the first memory, and write the generated data to a block during writing to the first memory.

Hereinafter, a memory system and a data writing method according to the embodiment will be described in detail with reference to the accompanying drawings. The invention is not limited to this embodiment. Hereinafter, the embodiment will be described after the configuration of a general memory system and a problem of a process of writing data to the memory system are described.

Figure 1:
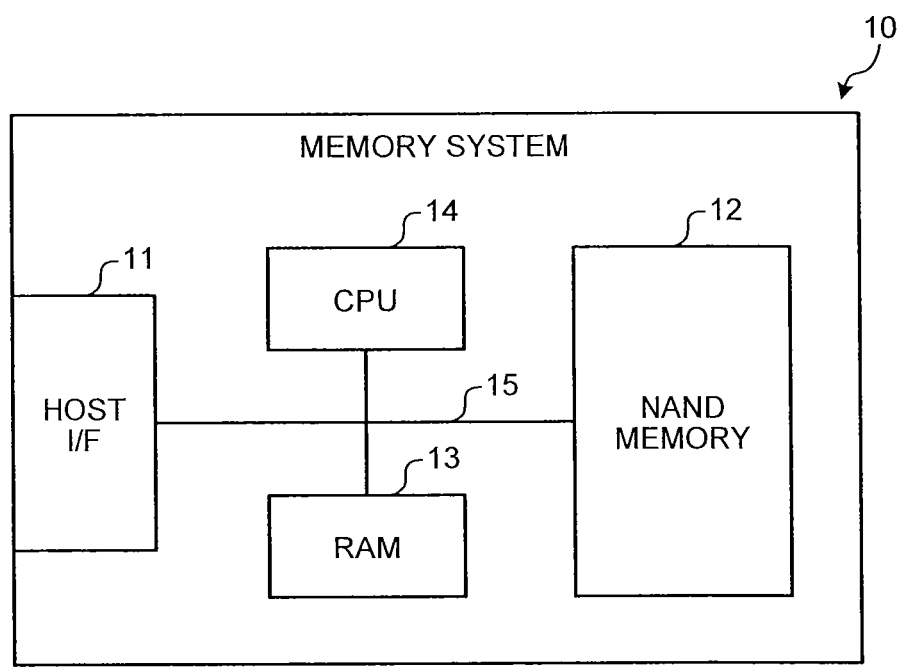
FIG. 1 is a block diagram illustrating a general configuration of a memory system.

FIG. 1 is a block diagram illustrating a general configuration of a memory system. A memory system 10 includes a host interface (hereinafter, referred to as a host I/F) 11, a NAND flash memory (hereinafter, referred to as a NAND memory) 12, a random access memory (RAM) 13, and a central processing unit (CPU) 14. These processing units are connected to each other via a bus 15.

The host I/F 11 is a memory connection interface such as an advanced technology attachment (ATA) interface (ATA I/F) and is an interface to connect with a host apparatus (not illustrated) such as a personal computer or a CPU core.

The NAND memory 12 is a storage device that can store data in a nonvolatile manner and is used as a storage unit that stores user data, a program, and internal data of the memory system. Specifically, the NAND memory 12 stores data designated by the host apparatus, and stores significant data desired to be preserved in a nonvolatile manner such as management information managing the storage position of the data in the NAND memory 12, firmware program, or the like. In the NAND memory, erasing is performed by a block unit, and writing and reading are performed by a page unit.

The RAM 13 is used as a temporary storage unit of a data transmission cache between the host apparatus and the NAND memory 12, a work area memory, and the like. As the data transmission cache of the RAM 13, for example, a write buffer that temporarily stores data written to the NAND memory 12 and a read buffer that temporarily stores data read from the NAND memory 12 are used. Further, a management table or the like in the NAND memory 12 developed at the time of activation is stored in the work area memory of the RAM 13. The management table is an information table that manages management information used to match logical addresses designated from the host apparatus with physical data storage positions in the NAND memory 12, and retains the latest information. When the user data is written or data is read and written in the management table, the management table is developed on the RAM 13.

As the RAM 13, a dynamic RAM (DRAM), a static RAM (SRAM), a ferroelectric RAM (FeRAM), a magnetoresistive RAM (MRAM), a phase change RAM (PRAM), or the like can be used.

The CPU 14 is a controller (control unit) that controls the memory system 10 and has functions of processing a command between the memory system 10 and the host apparatus, transmitting data between the NAND memory 12 and the host apparatus via the RAM 13, and managing each block in the NAND memory 12.

The memory system 10 has functions of being used as an external memory of the host apparatus, such as a secondary storage device (Solid State Drive: SSD), when connected to the host apparatus via the host I/F 11, storing data requested to be written from the host apparatus, and reading data requested to be read from the host apparatus and outputting the read data to the host apparatus.

In the memory system 10 having such a configuration, when data written to the RAM 13 is attempted to be stored in a nonvolatile manner, the data on the RAM 13 is written to the NAND memory 12. At this time, the management table is also updated in which an identification number (for example, a logical block address (LBA)) uniquely assigned to valid data to specify at which position written valid data is located in the NAND memory 12 is used as a key.

The NAND memory 12 has characteristics that (A) writing is performed by the page unit, (B) it is necessary to delete a block in advance when data is rewritten to a data-written region, and (C) deleting is performed by the block unit. Therefore, data is written sequentially in an vacant page of the NAND memory. In the step at which no vacant page is present, vacant pages are generally ensured by performing compaction (garbage collection), which is a process of moving valid data of a block including invalid data to a reusable block including no valid data and increasing reusable pages. Even when data is updated, the previously written data remains and data is written to another writable page. At this time, the previously written data becomes invalid data. When the writing, updating, and compaction of the data are performed, the management table is also updated. The management table is written to the NAND memory so that the management table is not lost even when power turns off.

In the general memory system 10, the updating of the data and an additional recording process of the page unit accompanied with the compaction and the updating of the management information are separately performed, and thus the data are written in different pages. In this method, however, when the size of data required to be written once is sufficiently smaller than the page, the data with a size unnecessarily larger than a size necessary in actual writing is written, and therefore the NAND memory may have been exhausted or the latency may have worsened.

Accordingly, an embodiment will be described to resolve the problem. Hereinafter, processing units used to resolve the problem will be described and processing units used in the general memory system 10 will not be described. Hereinafter, the description will be made exemplifying a process of writing user data from the RAM 13 to the NAND memory.

First Embodiment

Figure 2:
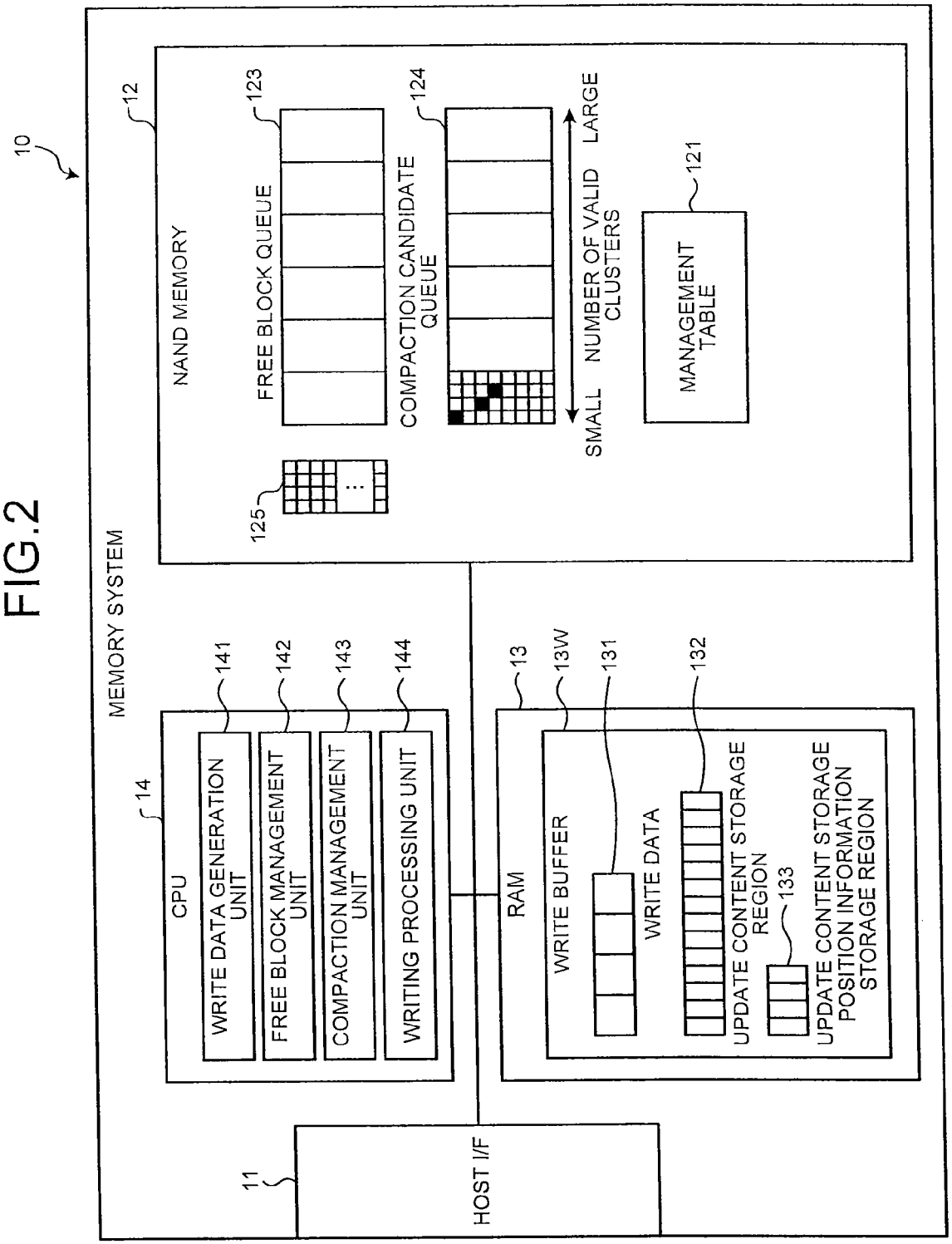
FIG. 2 is a block diagram schematically illustrating an example of a functional configuration of a memory system according to a first embodiment.

FIG. 2 is a block diagram schematically illustrating an example of a functional configuration of a memory system according to a first embodiment. In the memory system 10, a management table 121 is stored in a NAND memory 12. Free blocks in the NAND memory 12 are managed by a free block queue 123 and compaction candidate blocks are managed by a compaction candidate queue 124.

The management table 121 is information that uses an identification number uniquely allocated to valid data as a key to specify at which position the written valid data is located in the NAND memory 12. In the first embodiment, an LBA can be used as the identification number since the case in which the user data is written is exemplified. In the first embodiment, it is assumed that data is managed by a unit (referred to as a cluster) smaller than a page in the NAND memory 12.

Figure 3A:
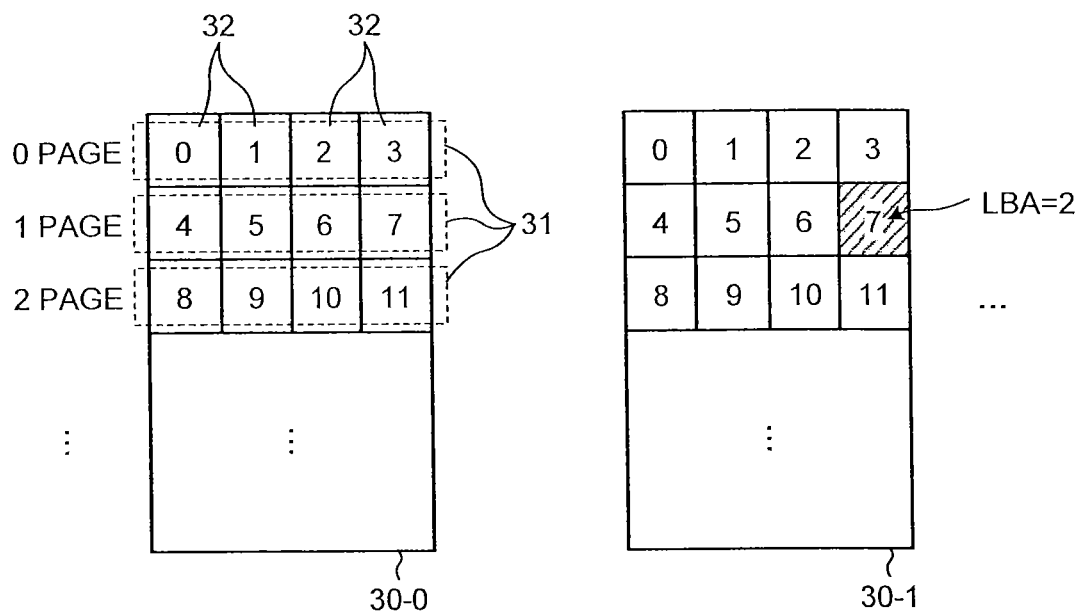
FIGS. 3A and 3B are diagrams illustrating an example of data management according to the first embodiment.
Figure 3B:
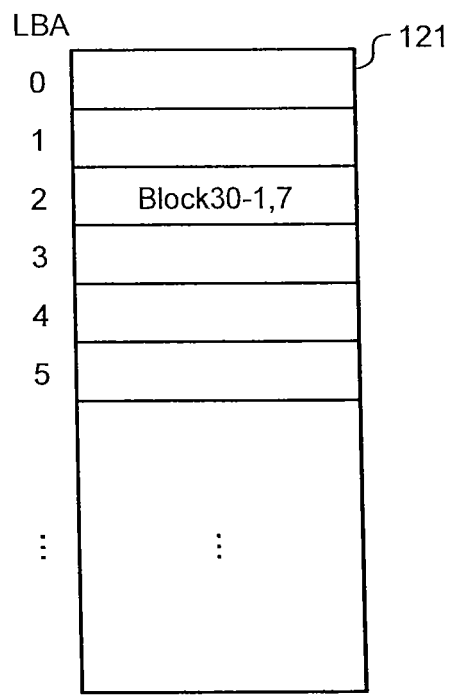

FIGS. 3A and 3B are diagrams illustrating an example of data management according to the first embodiment. FIG. 3A is the diagram schematically illustrating an example of a management unit in the NAND memory. FIG. 3B is the diagram illustrating an example of the management table. As illustrated in FIG. 3A, blocks 30-0, 30-1, and so on, which are a erasing unit of the NAND memory, are each configured by a plurality of pages 31 which are the write unit. The page 31 is configured by a plurality of clusters 32, which are a data management unit. In the first embodiment, a case in which one page 31 is configured by four clusters 32 is exemplified. Further, it is assumed that signs (identification numbers) such as 0, 1, 2, 3, 4, and so on are given sequentially from the clusters 32 at the leading address of the leading page (0 page) of the block 30-0. That is, a unique identification code is attached to each cluster 32 in each of the blocks 30-0, 30-1, and so on.

As illustrated in FIG. 3B, the management table 121 is information indicating at which block and at which cluster data designated by the LBA from the host apparatus is stored. For example, data designated by the LBA of "2" is stored in the cluster designated by number 7 of the block 30-1. In this example, one page 31 is configured by four clusters 32. However, one page 31 may be configured by a plurality of clusters 32.

The free block queue 123 is information indicating the position of a free block in which valid data is not present in the NAND memory 12. When writing is performed up to the final page of a write destination block 125, a new block to which the subsequent data is written is selected from the free block queue 123. Further, a block is erased at a selection timing of the new block.

The compaction candidate queue 124 is information indicating the position of a block having valid data and invalid data which are compaction candidates. The compaction candidate queues 124 are arranged in the order in which the number of valid clusters is small. When a compaction process to be described below is performed by the CPU 14, valid data to be subjected to the compaction is selected from a block having the smaller number of valid clusters among the compaction candidate queues 124.

The RAM 13 includes a write buffer 13W and a read buffer (not illustrated). The write buffer 13W temporarily stores write data 131 to be written to the NAND memory 12. The writ buffer 13W further includes an update content storage region 132 that has a predetermined size and temporarily stores update content indicating a new storage position of the write data 131 in the NAND memory 12 in time series and an update content storage position information storage region 133 that has a predetermined size and stores update content storage position information indicating the storage position of the update content of the management table 121 in the NAND memory 12.

The update content may be, for example, replacement data (difference data) of an updated portion in the management table 121. The update content may be, for example, information used to match a block address and an in-block offset indicating the position information in a block with the cluster-aligned LBA.

The update content of the update content storage region 132 is generated when a writing processing unit 144 additionally records the write data 131 in the write destination block 125 in the NAND memory 12. The update contents are accumulated until a timing at which nonvolatilization of data is requested, for example, when a flush command is issued or the update content storage region 132 becomes full.

The number of storage positions of the update contents entered in the update content storage position information storage region 133 is limited. Therefore, when the number of update contents included in the update content storage position information storage region 133 reaches the upper limit, it is assumed that the management table 121 is updated using the update content at the position instructed with the update content storage position information 133.

The CPU 14 includes a write data generation unit 141, a free block management unit 142, a compaction management unit 143, and the writing processing unit 144.

When a flush request is output from the host apparatus or the apparatus itself, the write data generation unit 141 generates write data for writing the data on the write buffer 13W of the RAM 13 to the NAND memory 12 on the RAM 13. At this time, when the size of the data is less than the page size and a difference between the page size and the size of the data is equal to or greater than the cluster size, update information including the update content of the management table 121 and the update content storage position or another data such as compaction data is added to the data by the unit of the cluster size, so that abundant data are stored within one page. The write data generation unit 141 has functions of storing the update content (update difference) of the data, of which the management information is changed when the storage position of the data is changed in the NAND memory 12 through the data update and the compaction, in a chronological order in the update content storage region 132, storing the storage position of the update content in a chronological order in the update content storage position information storage region 133, and extracting the update content corresponding to the data among the write data 131 and the compaction data, the storage position of the update content in the NAND memory 12, and the storage position of the update content before these update content in the NAND memory 12 to add the extracted update content and storage positions to the write data 131. Further the write data generation unit 141 has a function of adding the compaction data by the unit of the cluster size when a vacant region equal to or greater than one cluster size is present in the writing to the remaining update content storage region 132. When a difference between the page size and the data size of the update information including the update content in the remaining update content storage region 132 and the update content storage position until the present is equal to or greater than the cluster size, the write data generation unit 141 generates the write data by adding the compaction data to the update information by the unit of the cluster size.

For example, when the update data to be nonvolatilized is less than one page and a vacant region equal to or greater than one cluster size is present, a region corresponding to one cluster size is ensured as an update content addition region. In addition, update information which includes the update content corresponding the update data and update content storage position information, which is the storage position of the update content until the present after the reflecting the management table 121 including the storage position of the update content in the NAND memory 12 based on the update content, is stored in the update content addition region. As a result, when a vacant region equal to or greater than one cluster size is not present, data obtained by adding the update information to the update data is set as write data. Here, the size of each region to which the update content in the region of one cluster size and the content storage position information are written may have any value. Further, when not only the storage position of the update content corresponding to the currently written write data but also the storage position of the previously written update content are included as the update content storage position information, the storage positions of the previous update contents can be traced back in order.

Figure 4:
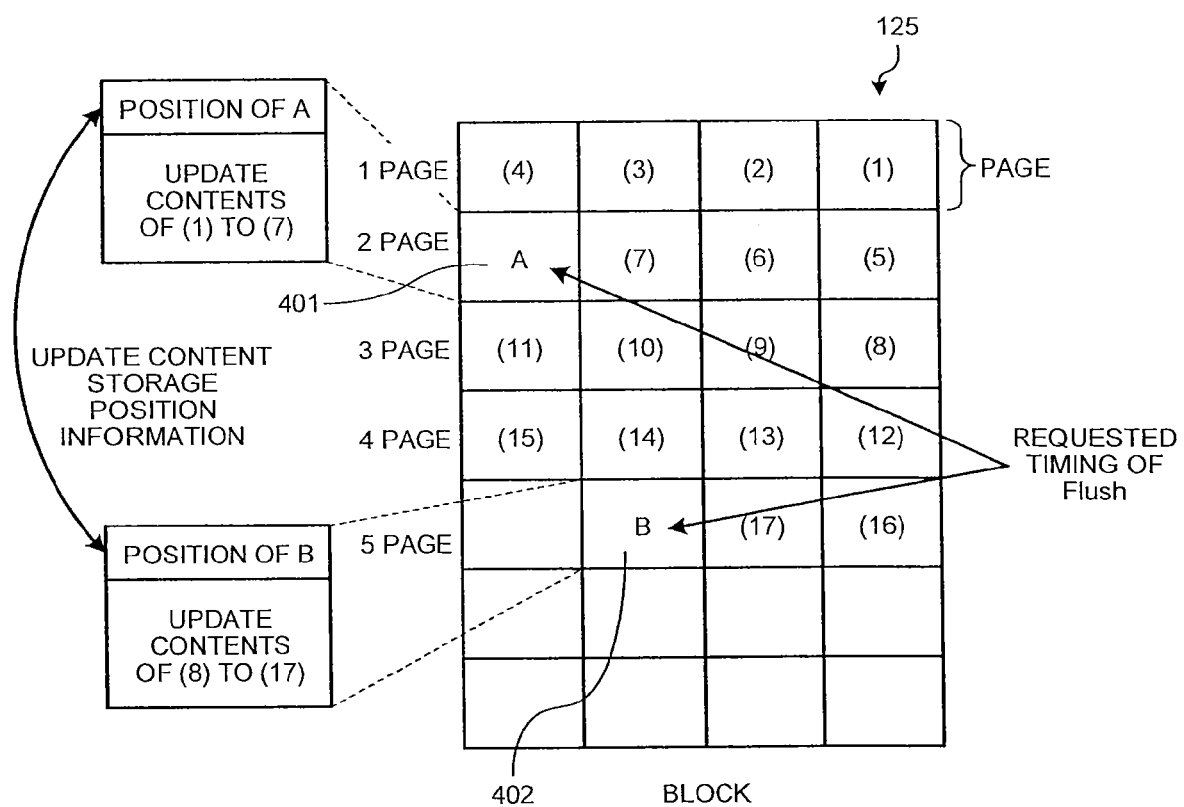
FIG. 4 is a diagram schematically illustrating a write destination block state.

FIG. 4 is a diagram schematically illustrating a write destination block state. As illustrated in the drawing, update information A including the update contents of the management table 121 corresponding to update data (1) to (7) and the storage positions of the update contents in the NAND memory 12 is recorded in a cluster 401. Further, update information B including the update contents of the management table 121 corresponding to update data (8) to (17) and the storage positions of the update contents accumulated in the update content storage position information storage region 133 after updating of the previous management table 121 is recorded in a cluster 402. The position of the cluster 402 which is the storage positions of the update contents of the management table 121 corresponding to the update data (8) to (17) as the storage positions of the update contents included in the update information B and the cluster 401 storing the update information A are included.

On the other hand, when a vacant region equal to or greater than one cluster size is still present, a region of a natural number multiple of the cluster size is ensured as a compaction data addition region. A cluster including valid data corresponding to the size of the compaction data addition region is acquired from the compaction candidate blocks in the compaction candidate queue 124 and is stored in the compaction data addition region. As a result, data obtained by adding the update content and the compaction data to the update data becomes the write data. At this time, an update difference between a new storage position of the valid data selected from the compaction candidate queue 124 in the NAND memory 12 and the original storage position is calculated, and the update content corresponding to the compaction data is stored in the update content addition region. Further, when the update content addition region is ensured, there is a probability that a vacant region is lost. Therefore, in this case, a vacancy corresponding to the compaction data is prepared in advance, or the update content is stored in the update content storage region 132 instead of the update content addition region when there is no vacancy.

The free block management unit 142 manages a free block in which the valid data is not present in the NAND memory 12. When a free block is generated, the free block management unit 142 registers the free block in the free block queue 123.

The compaction management unit 143 performs a process of searching a block for which the number of valid data (valid clusters) is equal to or less than a predetermined number in the block in the NAND memory 12, acquiring the block as a compaction candidate block, and registering the block in a compaction candidate queue in the order in which the number of valid clusters is smaller.

The writing processing unit 144 writes the write data with the page size generated by the write data generation unit 141 to the write destination block 125 of the NAND memory 12.

When the write destination block 125 is filled with the valid data, the writing processing unit 144 acquires the subsequent write destination block from the free block queue 123 and writes the data to the write destination block. When the update content storage position information of the write data 131 written to the write destination block 125 in the update content addition region has a preset size (the number of data), the writing processing unit 144 reflects the update content in the update content addition region to the management table 121.

Figure 5:
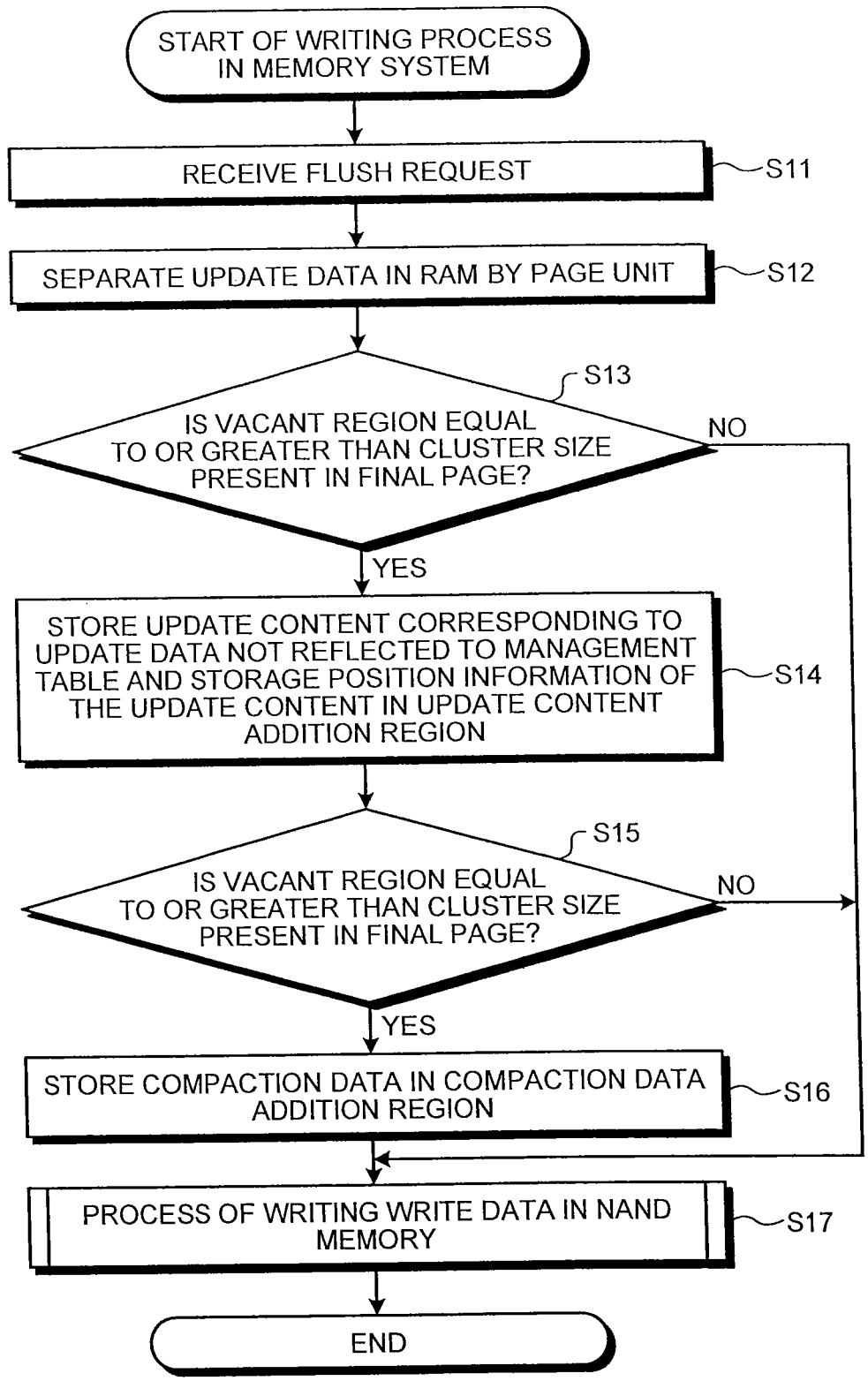
FIG. 5 is a flowchart illustrating an example of the processing procedure of a data writing method in the memory system according to the first embodiment.

Next, a method of writing data to the memory system 10 will be described. FIG. 5 is a flowchart illustrating an example of the processing order of the method of writing the data to the memory system according to the first embodiment. For example, when a flush request for nonvolatilization of the data on the RAM 13 (the write buffer 13W) is issued (step S11), the write data generation unit 141 generates the write data with the page size based on the update data on the RAM 13 by performing a process to be described below. First, the write data generation unit 141 separates the update data on the RAM 13 by the page unit (step S12) and determines whether a vacant region equal to or greater than the cluster size is present in the final page (step S13).

When a vacant region equal to or greater than the cluster size is present in the final page (Yes in step S13), the update content addition region of the cluster size is ensured in the final page of the update data. Then, the update content corresponding to the update data not reflected to the management table 121 and the storage position information of the update content are acquired from the update content storage region 132 and the update content storage position information storage region 133, respectively, and are stored in the update content addition region (step S14). The update content acquired at this time is erased from the update content storage region 132, but the storage position information of the acquired update content is not erased from the update content storage position information storage unit 133. Further, the storage position of the update content subjected to a reflecting process of the previous management table 121 is stored as the storage position information of the update content.

Thereafter, it is determined whether a vacant region equal to or greater than cluster size is present in the final page (step S15). When a vacant region equal to or greater than the cluster size is present (Yes in step S15), the region with a natural number multiple of the cluster size entered within the range of the vacant region is ensured as the compaction data addition region in the final page of the update data. Then, the valid data with the same size as the compaction data addition region is acquired from the compaction candidate block registered in the compaction candidate queue 124 and is stored in the compaction data addition region (step S16). At this time, when the update of the management table 121 generated at the movement of the data from the compaction candidate block to the write destination block 125 is also performed and the update content is stored in the update content addition region. Further, there is a probability that the vacant region is lost when the update content addition region is ensured. In this case, when a vacancy corresponding to the compaction data is prepared in advance. Alternatively, when no vacancy is present, the update content is stored in the update content storage region 132 instead of the update content addition region.

Thereafter, or when a vacant cluster is not present in step S13 or step S15 (No in step S13 or step S15), a process of writing the generated write data in the NAND memory 12 is performed (step S17) and the process of writing the data ends.

Figure 6:
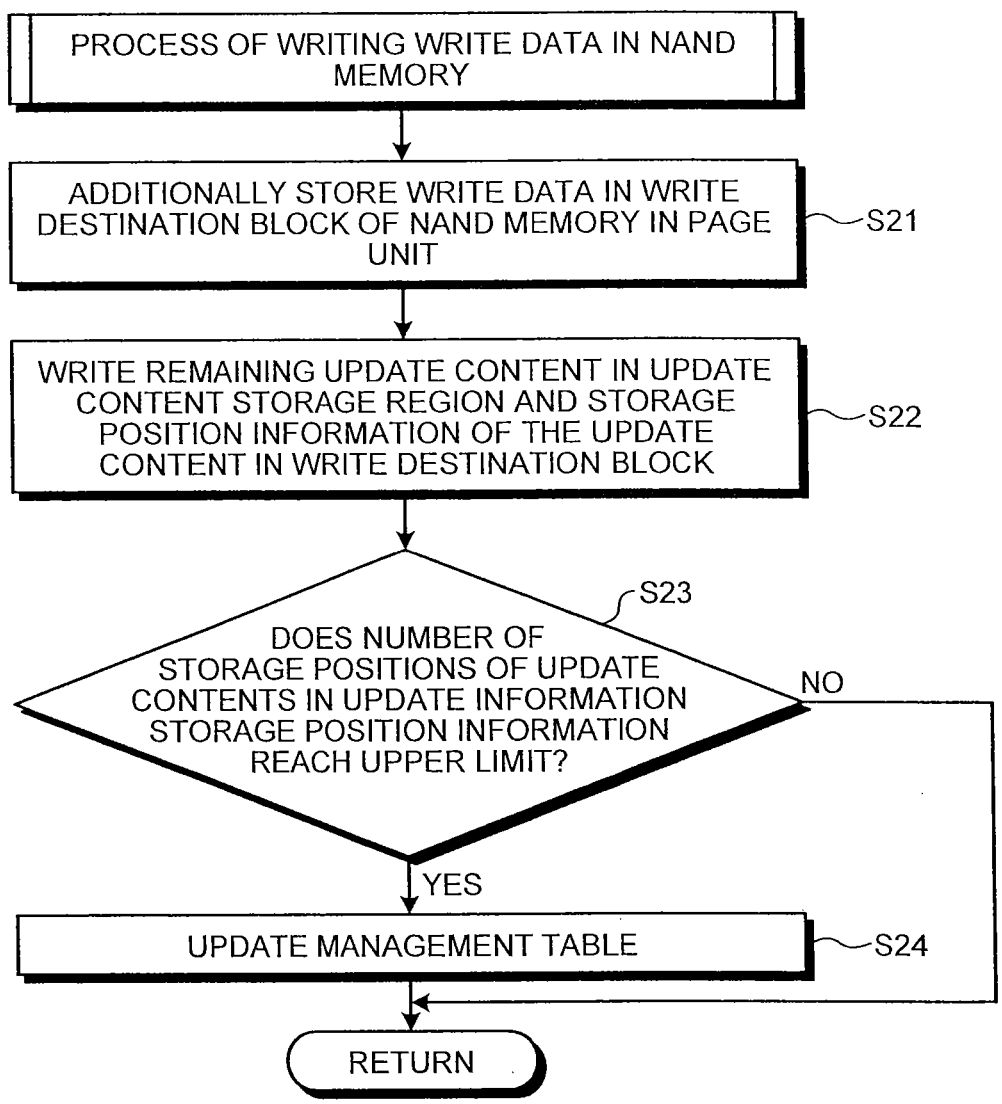
FIG. 6 is a flowchart illustrating an example of the processing procedure of writing write data to a NAND memory.

FIG. 6 is a flowchart illustrating an example of the order of the process of writing the write data in the NAND memory. In the writing process, the writing processing unit 144 additionally records the generated write data in the write destination block 125 in the NAND memory 12 in the page unit (step S21). Thereafter, the writing processing unit 144 writes the remaining update content and the storage position information of the update content stored in the update content storage region 132 into the write destination block 125 (step S22). Thereafter, it is determined whether the number of storage positions of the update contents in the update content storage position information region 122 reaches the upper limit (step S23). When the number of storage positions of the update contents does not reach the upper limit (No in step S23), the writing process ends.

Conversely, when the number of storage positions of the update contents reaches the upper limit (Yes in step S23), writing processing unit 144 acquires the storage position of the update content from the update content storage position information region 122 and updates the management table 121 by performing a process of reflecting the update content stored at the storage position to the management table 121 in the order of the storage positions of the update contents included in the update content storage position information region (step S24). For example, in the example of FIG. 4, the update information is recorded in the cluster 402 of the write destination block 125. However, when the number of update content storage position information in the update information reaches the upper limit, the storage position information can be traced back from the information included in the cluster to the oldest update content storage position information due to the fact that the previous update content storage position information is recorded in the cluster. When the cluster 401 is the oldest update content storage position information, the management table 121 is updated based on the update content included in the cluster 401, and then the management table is updated based on the update content included in the cluster 402. By doing this, the process of writing the write data in the NAND memory 12 ends.

By performing the processes on all of the update data in the write buffer 13W of the RAM 13, the update data is stored in the NAND memory 12 in a nonvolatile manner. When the writing process is performed up to the final page of the write destination block 125 in step S21 and step S22, a free block selected from the blocks registered in the free block queue 123 becomes a new write destination block 125, and the write data is written to the new write destination block 125.

Next, the writing process according to the first embodiment will be described giving a specific example.
<When Update Content of Management Information and Compaction Data are Stored in Page Including Update Data>

Figure 7:
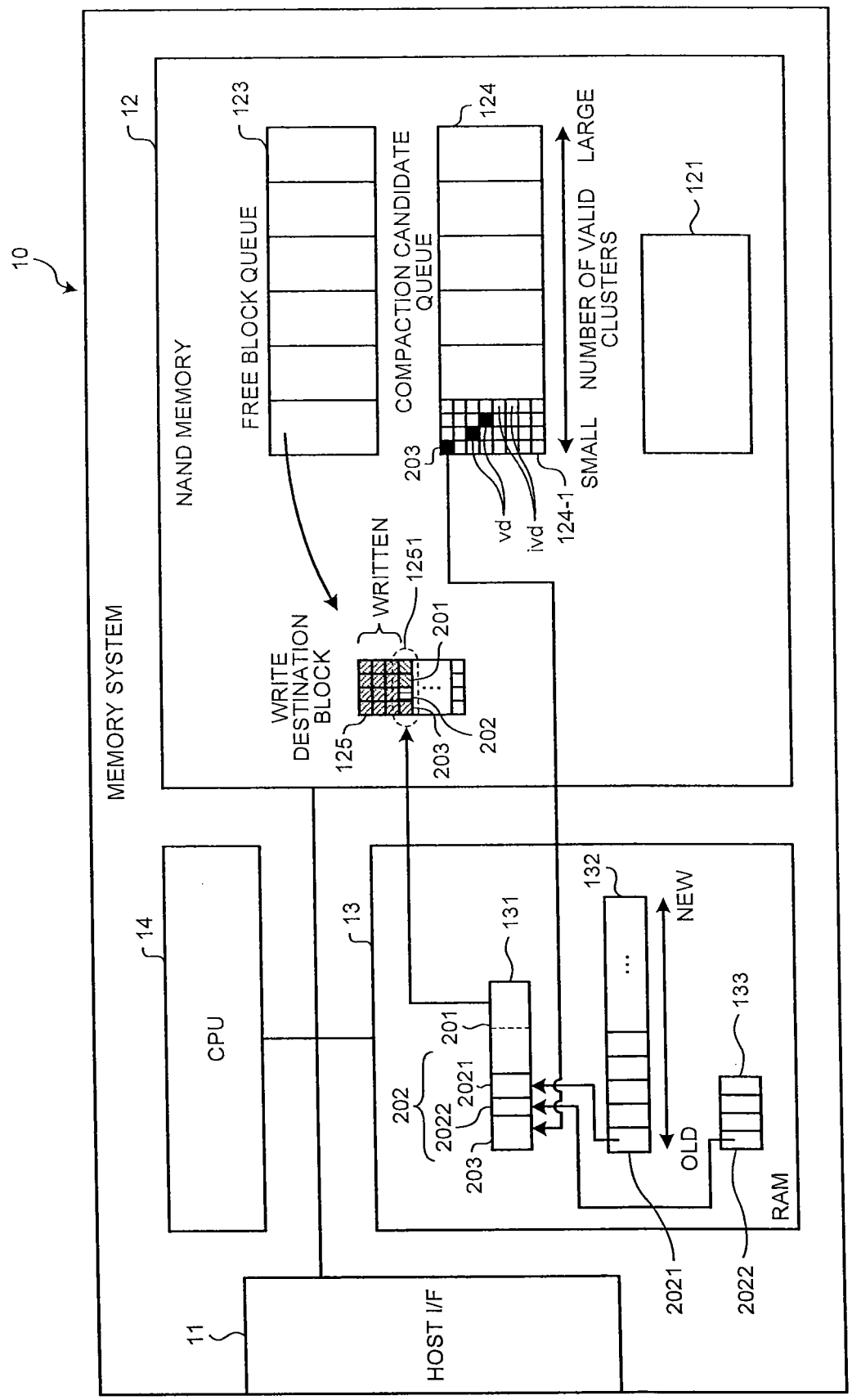
FIG. 7 is a diagram schematically illustrating an example of the flow of a writing process when update content of management information and compaction data are stored in a page including update data.

FIG. 7 is a diagram schematically illustrating an example of the flow of the writing process when the update content of the management information and the compaction data are stored in the page including the update data. As illustrated in the drawing, after a flush request is issued, update data 201 is first stored in the write data 131 corresponding to one page in the RAM 13. Here, the update data 201 is assumed to be data amount stored in the size of two clusters.

Here, since a vacant region corresponding the size of one or more clusters is present in the write data 131 corresponding to one page, the write data generation unit 141 sets the vacant region corresponding to the size of one cluster as an update content addition region. A update content 2021 of the management table 121 corresponding to the update data 201 acquired from the update content storage region 132 is stored in the update content addition region. At this time, the update content 2021 with a size equal to or greater than a predetermined size may not be stored in the update content addition region. Further, a storage position 2022 (cluster position) of the update content up to the current update after the update of the previous management table 121 is acquired from the update content storage position information storage region 133 and is stored in the update content position information region. The update information 202 is configured by the update content 2021 and the storage position 2022 of the update content.

Further, since the vacant region with the size of one or more clusters is present in the write data 131 corresponding to one page, the write data generation unit 141 sets the vacant region corresponding to the size of one cluster as the compaction data addition region and stores the compaction data 203 in the compaction data addition region. The compaction data 203 is selected from valid data vd among the compaction candidate blocks 124-1 with the smallest number of valid clusters in the compaction candidate queue 124. In the drawing, the valid data vd is indicated by a black color and invalid data ivd is indicated by a blurred color. Thus, data is included in all of the regions corresponding to four clusters that form the write data 131 corresponding to one page.

Thereafter, the writing processing unit 144 additionally records the write data 131 in the RAM 13 in a non-written page 1251 of the write destination block 125 of the NAND memory 12. Thus, the process of writing the update data in the NAND memory 12 ends.

<When Update Content of Management Information is Stored in Page Including Update Data>

Figure 8:
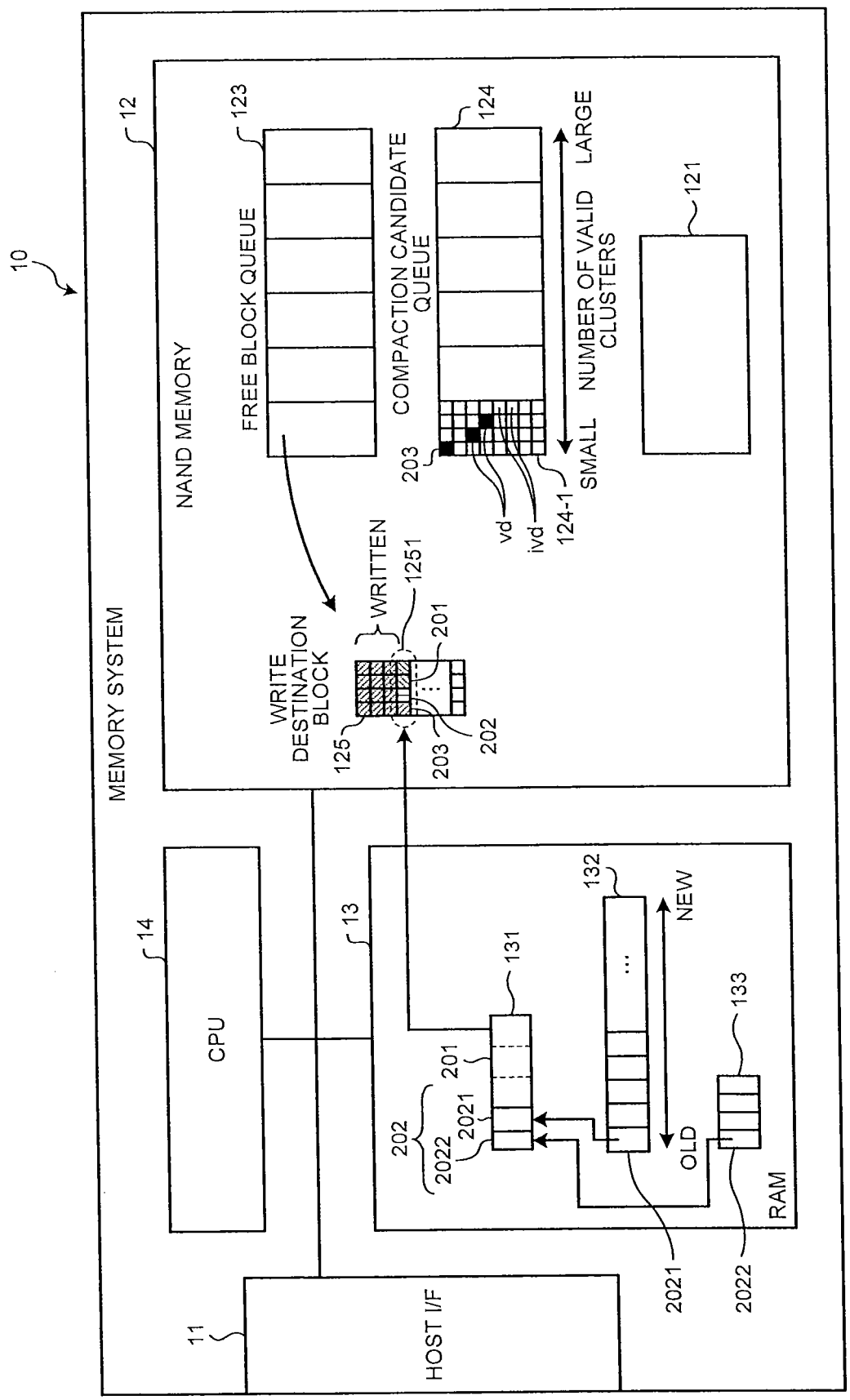
FIG. 8 is a diagram schematically illustrating an example of the flow of a writing process when the update content of the management information is stored in the page including the update data.

FIG. 8 is a diagram schematically illustrating an example of the flow of the writing process when the update content of the management information is stored in the page including the update data. As illustrated in the drawing, after a flush request is issued, update data 201 is first stored in the write data 131 corresponding to one page in the RAM 13. Here, the update data 201 is assumed to be data amount stored in the size of three clusters.

Next, since a vacant region corresponding to the size of one or more clusters is present in the write data 131 corresponding to one page, the write data generation unit 141 sets the vacant region corresponding to the size of one cluster as an update content addition region. An update content 2021 of the management table 121 corresponding to the update data 201 acquired from the update content storage region 132 is stored in the update content addition region. Further, a storage position 2022 (cluster position) of the update content up to the current update after the update of the previous management table 121 is acquired from the update content storage position information storage region 133 and is stored in the update content position information region. The update information 202 is configured by the update content 2021 and the storage position 2022 of the update content. At this time, since the vacant region equal to or greater than the size of one cluster is not present in the write data 131 corresponding to one page, the generation of the write data ends. Thus, data is included in all of the regions corresponding to four clusters that form the write data 131 corresponding to one page.

Thereafter, the writing processing unit 144 additionally records the write data 131 on the RAM 13 in a non-written page 1251 of the write destination block 125 of the NAND memory 12. Thus, the process of writing the update data in the NAND memory 12 ends.

Thus, the write destination block 125 stores not only the update data but also the update information 202 that includes the update content 2021 of the management table 121 changed by writing the update data in the NAND memory 12 and the storage position 2022 in the update content 2021 in the NAND memory 12. When the update content 2021 is not reflected to the management table 121 and power turns off and then turns on, the update information 202 is referred to. Specifically, in the finally additionally recorded block, a block address is nonvolatilized in the block unit and a erased page of the block address of the additionally recorded block is searched when the power turns off and then turns on. Since the leading erased page in the block is searched through the searching of the erased page, the page immediately before the leading erased page becomes the finally additionally recorded page, and the position (cluster position) including the previously updated update content 2021 can be traced back based on the storage position 2022 of the update content in the update information 202 included in this additionally recorded page, the management table 121 can be restored based on the update content 2021 included in the cluster position.

As described above, the update content of the management table 121 corresponding to the update data is stored in a vacant region with the cluster size prior to the compaction data, when the update data has a size smaller than the page size and the difference between the page size and the size of the update data is equal to or greater than the cluster size. However, the update content may not be stored and the compaction data may be stored in a vacant region with the cluster size of a natural number multiple. In this case, the update content in the update content storage region 132 may be collectively written.

As described above, the case in which the data is written in the NAND memory 12 has been exemplified, but the invention is not limited to the NAND memory 12. The above-described embodiment is applicable to a nonvolatile memory in which data is managed in a first unit and the data is written in an integer multiple of two or more of the first unit.

Further, the case in which the user data on the RAM 13 is written in the NAND memory 12 has been described, but the invention is not limited to the user data. The above-described embodiment is applicable to general data stored in the RAM 13 and written in the NAND memory 12. For example, the above-described embodiment is applicable to a case in which internal data such as a statistical information including the number of writings from the host apparatus, the size of the data written from the host apparatus, setting of a basic input/output system (BIOS), or the like, log information of an internal operation of the memory system 10, or firmware update data used in the memory system 10 is written from the RAM 13 to the NAND memory 12. In the management of the internal data, an LBA may be used or an address system corresponding to the LBA used only in the management of the internal data may also be used.

As described above, the case has been described in which data obtained by replacing a part of the management table 121 is used as the update content, but the case in which data obtained by replacing the entire table is used as the update content may be employed. In this case, however, the update content storage position information storage region 133 installed in the RAM 13 is not necessary. Therefore, only the update content 2021 is added to the write data 131.

According to the first embodiment, as described above, the cluster smaller the page has been used as the management unit of the data in the NAND memory 12. When the update data on the RAM 13 is written in the NAND memory 12 and the difference between the page size and the size of the update data is equal to or greater than the cluster size, the update content of the management table 121 corresponding to the update data or the compaction data has been added in the unit of the cluster size. Thus, since the data is included in each of the clusters forming the page of the writing unit, this writing process is different from a data writing process in which vacant regions are abundant. Therefore, it is possible to obtain an advantage of efficiently performing the writing process in the NAND memory 12.

By adding a different kind of data to one write data and writing the data in the NAND memory 12, it is possible to obtain an advantages of reducing the writing amount of the NAND memory 12 and improving the lifespan of the NAND memory 12 and the latency of the NAND memory 12, compared to a case in which the data are separately written. In particular, when a flush request is frequently issued or the capacity of the write buffer 13W is small, the advantages are effective.

Further, since not only the update data and the update content of the management table 121 corresponding to the update data but also the compaction data are stored, it is possible to obtain an advantage of performing a compaction process (prefetch) on some of the valid data in a compaction target block in advance before the compaction process is solely performed.

Second Embodiment

Figure 9:
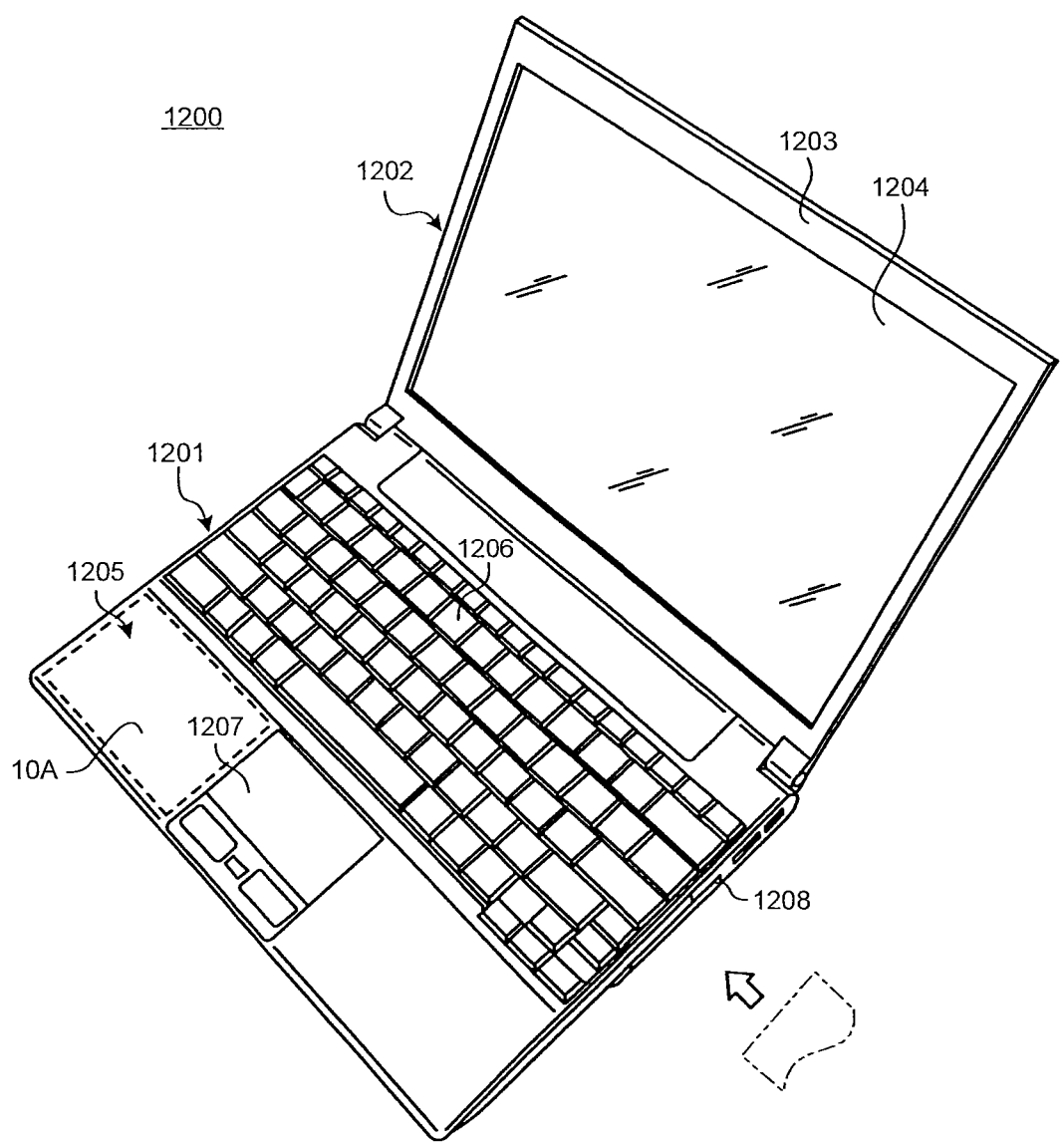
FIG. 9 is a perspective view illustrating an example of a personal computer on which an SSD is mounted.

FIG. 9 is a perspective view illustrating an example of a personal computer provided with an SSD. The personal computer 1200 includes a main unit 1201 and a display unit 1202. The display unit 1202 includes a display housing 1203 and a display device 1204 provided in the display housing 1203.

The main unit 1201 includes a housing 1205, a keyboard 1206, and a touch pad 1207, which is a pointing device. For example, a main circuit board, an Optical Disk Device (ODD) unit, a card slot, and an SSD 10A are provided in the housing 1205. The SSD corresponds to the memory system described in the first embodiment.

The card slot is provided adjacent to the circumferential wall of the housing 1205. An opening portion 1208 facing the card slot is provided in the circumferential wall. The user can insert an additional device into the card slot through the opening portion 1208 from the outside of the housing 1205.

The SSD 10A may be provided in the personal computer 1200 instead of an HDD according to the related art and then used. Alternatively, the SSD 10A may be used as an additional device while being inserted into the card slot of the personal computer 1200.

Figure 10:
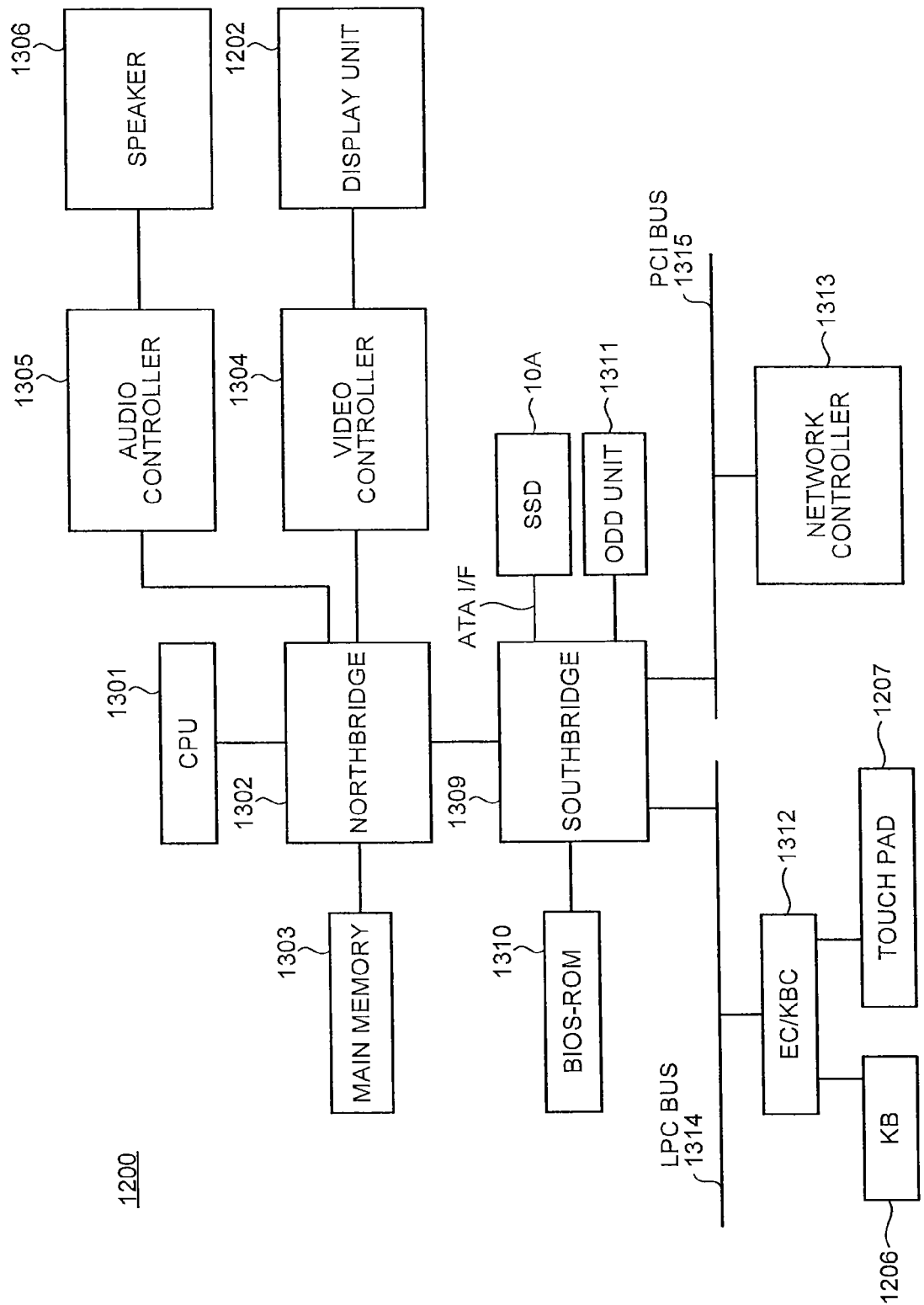
FIG. 10 is a block diagram illustrating an example of the system configuration of the personal computer provided with the SSD.

FIG. 10 is a block diagram illustrating an example of the system configuration of the personal computer provided with the SSD. The personal computer 1200 includes, for example, a CPU 1301, a northbridge 1302, a main memory 1303, a video controller 1304, an audio controller 1305, a southbridge 1309, a BIOS-ROM 1310, the SSD 10A, an ODD unit 1311, an embedded controller/keyboard controller IC (EC/KBC) 1312, and a network controller 1313.

The CPU 1301 is a processor that is provided in order to control the operation of the personal computer 1200 and executes an operating system (OS) which is loaded from the SSD 10A to the main memory 1303. When the ODD unit 1311 can perform at least one of a process of reading data from an inserted optical disk and a process of writing data to the optical disk, the CPU 1301 performs the process.

In addition, the CPU 1301 executes a system Basic Input Output System (BIOS) stored in the BIOS-ROM 1310. The system BIOS is a program for controlling hardware in the personal computer 1200.

The northbridge 1302 is a bridge device that connects a local bus of the CPU 1301 and the southbridge 1309. The northbridge 1302 includes a memory controller that controls access to the main memory 1303.

The northbridge 1302 has a function of communicating with the video controller 1304 and the audio controller 1305 through an Accelerated Graphics Port (AGP) bus.

The main memory 1303 temporarily stores programs or data and functions as a work area of the CPU 1301. The main memory 1303 is, for example, a DRAM.

The video controller 1304 is a video reproduction controller that controls the display unit 1202 used as a display monitor of the personal computer 1200.

The audio controller 1305 is an audio reproduction controller that controls a speaker 1306 of the personal computer 1200.

The southbridge 1309 controls each device on an Low Pin Count (LPC) bus 1314 and each device on a Peripheral Component Interconnect (PCI) bus 1315. In addition, the southbridge 1309 controls the SSD 10A, which is a storage device storing various kinds of software and data, through an ATA interface.

The personal computer 1200 accesses the SSD 10A in a sector unit. For example, a write command, a read command, and a flash command are input to the SSD 10A through the ATA interface.

The southbridge 1309 has a function of controlling access to the BIOS-ROM 1310 and the ODD unit 1311.

The EC/KBC 1312 is a one-chip microcomputer obtained by integrating an embedded controller for managing power with a keyboard controller for controlling the keyboard (KB) 1206 and the touch pad 1207.

The EC/KBC 1312 has a function of turning on or off a power supply of the personal computer 1200 according to the operation of a power button by the user. The network controller 1313 is a communication device that communicates with an external network, such as the Internet.

The personal computer 1200 supplies power to the SSD 10A and issues an interruption request (standby request) to the SSD 10A. Even when the supply of the power from the personal computer 1200 to the SSD 10A is improperly interrupted, a write error can be prevented from occurring.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
   a first memory including a plurality of blocks, each of the plurality of blocks being a data erasing unit and including a plurality of pages, each of the plurality of pages being a data writing unit and capable of storing a plurality of clusters;
   a second memory configured to temporarily store data read out from the first memory; and
   a controller configured to write data stored in the second memory to one or more of the data writing units of the first memory and manage a storage position of the data in the first memory,
   wherein the first memory includes a management information storage region that stores management information indicating the storage position of the data in the first memory, and when the controller writes update data in the second memory to the first memory and a difference between a size of the page and a size of the update data is equal to or greater than a size of the cluster, the controller configured to:
generate write data by adding, to the update data, data which has the size of the cluster;
store an update content of the management information corresponding to the update data and an update content storage position indicating a storage position of the update content of the management information in the first memory; and
write the generated write data to a block in writing of the first memory.

2. The memory system according to claim 1, wherein when the controller writes the update data in the second memory to the first memory and the difference between the size of the page and the size of the update data is equal to or greater than the size of the cluster, the controller configured to:
generate the write data by adding valid data acquired from a compaction candidate block including valid data and invalid data in the first memory to the update data; and
write the generated write data to a block in the writing of the first memory.

3. The memory system according to claim 2, wherein when the controller writes the update data in the second memory to the first memory, the difference between the size of the page and the size of the update data is equal to or greater than the size of the cluster, and the compaction candidate block including the valid data and invalid data are present in the first memory, the controller configured to:
generate the write data by adding, to the update data, data which has the size of the cluster and stores the update content and the update content storage position indicating the storage position of the update content of the management information in the first memory in preference to the valid data; and
write the generated write data to a block in the writing of the first memory.

4. The memory system according to claim 2, wherein the controller configured to acquire the valid data from a compaction target block with the smallest number of valid data among the compaction candidate blocks.

5. The memory system according to claim 1, wherein when a difference between the size of the page and the size of the update data to which the data storing the update content and the update content storage position are added is equal to or greater than the size of the cluster, the controller configured to generate the write data by further adding, to the update data, valid data acquired from a compaction candidate block including valid data and invalid data in the first memory.

6. The memory system according to claim 1, wherein when the controller writes, to the first memory, the update content of the management information in the second memory and the update content storage position indicating the storage position of the update content of the management information in the first memory and a difference between the size of the page and a size of the update content of the management information and the update content storage position is equal to or greater than the size of the cluster, the controller configured to:
generate the write data by adding valid data acquired from a compaction candidate block including valid data and invalid data in the first memory to the update content of the management information and the update content storage position;
write the generated write data to a block in the writing of the first memory.

7. The memory system according to claim 1, wherein an upper limit value is set in the number of the update content storage positions which can be written in the write data, and
when the number of the update content storage positions stored in the write data reaches the upper limit value, the controller configured to update the management information based on the update content stored at a position indicated in the update content storage position in the write data.

8. The memory system according to claim 1, wherein after writing the write data, the controller configured to write the update content remaining in the second memory to the block in the writing.

9. The memory system according to claim 1, wherein when the block in the writing is full, the controller configured to select a free block including no valid data in the first memory as a block in which subsequent writing is performed.

10. The memory system according to claim 1, wherein the data is user data or internal data of the memory system.

11. A data writing method in a memory system including a first memory including a plurality of blocks, each of the plurality of blocks being a data erasing unit and including a plurality of pages, each of the plurality of pages being a data writing unit and capable of storing a plurality of clusters, a second memory configured to temporarily store data read out from the first memory, and a controller configured to write data stored in the second memory to one or more of the data writing units of the first memory and manage a storage position of the data in the first memory, the method comprising:
determining whether a difference between a size of the page and a size of the update data is equal to or greater than a size of the cluster, when an update data nonvolatilization request is received and the update data has the size smaller than the size of the page;
generating, on the second memory, write data by adding data having the size of the cluster and storing an update content of management information corresponding to the update data to the update data, when a difference between the size of the page and the size of the update data is equal to or greater than the size of the cluster; and
writing the write data to a block in writing of the first memory.

12. The writing method in the memory system according to claim 11, wherein in the generating of the write data, when the difference between the size of the page and the size of the update data is equal to or greater than the size of the cluster, the write data obtained by adding valid data acquired from a compaction candidate block including valid data and invalid data in the first memory to the update data is generated on the second memory.

13. The writing method in the memory system according to claim 12,
wherein in the determining, it is determined whether the difference between the size of the page and the size of the update data is equal to or greater than the size of the cluster, when the update data nonvolatilization request is received and the update data has the size smaller than the size of the page, and
in the generating of the write data, when the difference between the size of the page and the size of the update data is equal to or greater than the size of the cluster and the compaction candidate block including the valid data and the invalid data are present in the first memory, the write data obtained by adding, to the update data, data which has the size of the cluster and stores the update content in preference to the valid data is generated on the second memory.

14. The writing method in the memory system according to claim 12, wherein in the generating of the write data, the valid data is acquired from a compaction target block with the smallest number of the valid data among the compaction candidate blocks.

15. The writing method in the memory system according to claim 11, wherein in the generating of the write data, when a difference between the size of the page and the size of the update data to which the data storing the update content and the update content storage position are added is equal to or greater than the size of the cluster, the write data is generated by further adding, to the update data, valid data acquired from a compaction candidate block including valid data and invalid data in the first memory.

16. The writing method in the memory system according to claim 11,
wherein in the determining, when a sum of sizes of the update content of the management information in the second memory and the update content storage position indicating the storage position of the update content of the management information in the first memory is less than the size of the page, it is determined whether a difference between the size of the page and the size of the update content of the management information and the update content storage position is equal to or greater than the size of the cluster, and
in the generating of the write data, when the difference between the size of the page and the size of the update content of the management information and the update content storage position is equal to or greater than the size of the cluster, the write data obtained by adding valid data acquired from a compaction candidate block including valid data and invalid data in the first memory to the update content of the management information and the update content storage position is generated.

17. The writing method in the memory system according to claim 11,
wherein in the generating of the write data, an upper limit value is set in the number of the update content storage positions which can be written in the write data, and
when the number of the update content storage positions stored in the write data reaches the upper limit value, the management information stored in the first memory is updated based on the update content stored at a position indicated in the update content storage position in the write data.

18. The writing method in the memory system according to claim 11, wherein in the writing of the write data to the block, after writing the write data, the update content remaining in the second memory is written to the block in the writing.

19. The writing method in the memory system according to claim 11, wherein in the writing of the write data to the block, when the block in the writing is full, a free block including no valid data in the first memory is selected as a block in which subsequent writing is performed.

20. The writing method in the memory system according to claim 11, wherein the data is user data or internal data of the memory system.

* * * * *